United States Patent [19]
Perkins

[11] Patent Number: 5,452,106
[45] Date of Patent: Sep. 19, 1995

[54] MODEM DEVICE FOR COMMUNICATION OF FACSIMILE OR FILE DATA

[75] Inventor: John L. Perkins, St Kilda, Australia

[73] Assignee: Exfax Technologies Ltd Pty

[21] Appl. No.: 170,289

[22] PCT Filed: May 27, 1993

[86] PCT No.: PCT/AU93/00247

§ 371 Date: Dec. 30, 1993

§ 102(e) Date: Dec. 30, 1993

[87] PCT Pub. No.: WO93/25041

PCT Pub. Date: Dec. 9, 1993

[30] Foreign Application Priority Data

May 27, 1992 [AU] Australia .................. PL2631
Dec. 31, 1992 [AU] Australia .................. PL6629

[51] Int. Cl.⁶ .............................................. H04N 1/32
[52] U.S. Cl. ............................................. 358/468; 358/442; 358/434; 379/100
[58] Field of Search ............... 358/400, 434, 435, 436, 358/442, 444, 468; H04N 1/32; 379/96–98, 100, 93; 375/8

[56] References Cited

U.S. PATENT DOCUMENTS

| | | | |
|---|---|---|---|
| 4,652,933 | 3/1987 | Koshiishi | 358/256 |
| 4,802,204 | 1/1989 | Chang | 358/400 |
| 4,816,911 | 3/1989 | Kirsch et al. | 358/256 |
| 4,827,349 | 5/1989 | Ogata et al. | 358/256 |
| 4,850,008 | 7/1989 | Berg et al. | 379/93 |
| 4,910,506 | 3/1990 | Yoshida et al. | 358/400 |
| 4,910,607 | 3/1990 | Kita et al. | 358/400 |
| 4,914,688 | 4/1990 | Kobayashi et al. | 379/93 |
| 4,991,200 | 2/1991 | Lin | 358/442 |
| 5,020,096 | 5/1991 | Sakakibara et al. | 358/402 |
| 5,062,133 | 10/1991 | Melrose | 379/94 |
| 5,127,048 | 6/1992 | Press et al. | 379/100 |
| 5,196,943 | 3/1993 | Hersee et al. | 379/100 |
| 5,202,899 | 4/1993 | Walsh | 379/100 |
| 5,227,893 | 7/1993 | Ett | 358/400 |
| 5,289,582 | 2/1994 | Hirata et al. | 358/400 |

FOREIGN PATENT DOCUMENTS

| | | |
|---|---|---|
| 4070385 | 3/1985 | Australia . |
| 0212199 | 3/1987 | European Pat. Off. . |
| 0291307 | 11/1988 | European Pat. Off. . |
| 0426412 | 5/1991 | European Pat. Off. . |
| 1168161 | of 0000 | Japan . |
| 59224964 | of 0000 | Japan . |
| 1168160 | 7/1989 | Japan . |
| PCTUS90/01065 | of 0000 | WIPO . |
| 9110309 | of 0000 | WIPO . |
| 9325041 | 12/1993 | WIPO . |

Primary Examiner—Edward L. Coles, Sr.
Assistant Examiner—Kim Yen Vu
Attorney, Agent, or Firm—Biebel & French

[57] ABSTRACT

The present invention relates to a facsimile device for local facsimile to computer interconnection. A preferred embodiment of the present invention is comprised of the facsimile device 3 which is capable of being connected to a facsimile transceiver 1 and a computer 2. The facsimile device 3 allows the computer 2 to print data on the facsimile transceiver 1 using the facsimile device 3. Similarly, a document scanned on the facsimile transceiver 1 can be communicated to the computer 2 by the facsimile device 3. Under the control of a microprocessor 10, it is also possible to send or receive a facsimile or transfer a file using facsimile protocols from the computer to the telephone network, or vice versa, which may be connected to the device 3 at connector 15. Similarly, the facsimile transceiver 1 can send or receive documents by the telephone network.

15 Claims, 7 Drawing Sheets

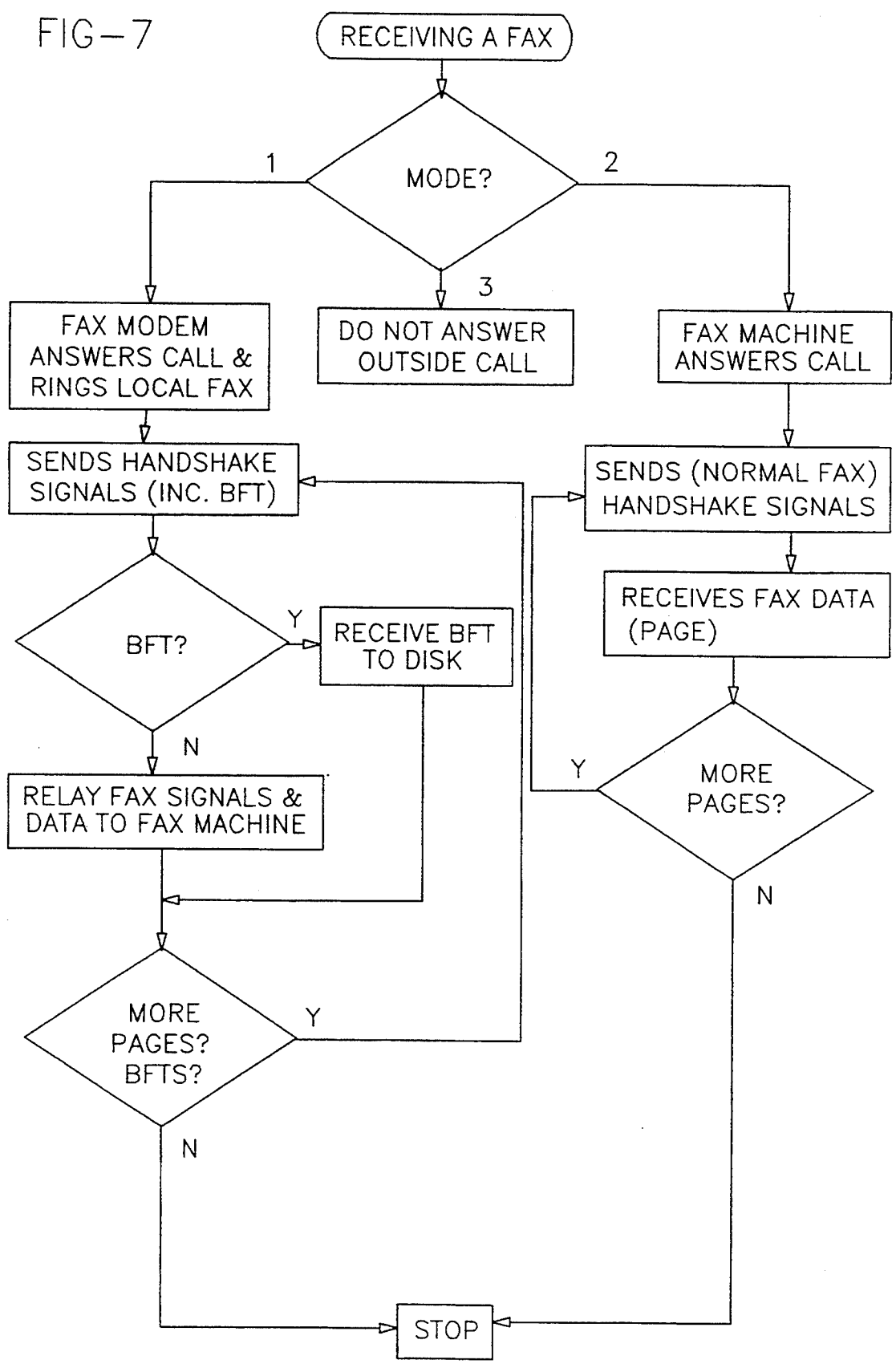

MODEM DEVICE FOR COMMUNICATION OF FACSIMILE OR FILE DATA

TECHNICAL FIELD

The present invention relates to a facsimile device for connecting a facsimile transceiver to a computer. The facsimile device may also be connected to a telephone network.

DESCRIPTION OF THE PRIOR ART

According to the prior art it is known to have facsimile modems and data modems for performing facsimile transmission of documents or file transfers using facsimile protocols. Such devices may be either internal or external devices which can be connected to computer provided with the appropriate software. However, such devices may not be easily interconnected with an existing facsimile transceiver at the same local site. Prior art devices provide only for connection to a facsimile device at a remote site over a telephone network. Therefore, any connection between the computer and the local facsimile transceiver is only possible via the telephone network. In such a case, a telephone exchange and telephone lines are required to communicate between the computer and the facsimile transceiver.

BACKGROUND TO THE INVENTION

In order to describe the scope of the current invention it is desirable to briefly outline the operational procedures of facsimile communications and the incorporation of file transfer within these procedures. This may be done with reference to the five Phases in a facsimile transmission:

Phase A is the call establishment and line connection of equipment,

Phase B is the pre-message signalling and capability selection,

Phase C is the facsimile message transfer,

Phase D is the post-message signalling, and

Phase E is the call disconnection.

In particular Phase B is the low speed (300 baud) pre-message signalling in which the capabilities of the respective machines are indicated and selected. In particular the called station first responds with a Digital Information Signal (DIS) in which its capabilities in terms of group type, speed, resolution, and other special capabilities are indicated. At this time file transfer capabilities may also be indicated. The calling machine then responds with a Digital Command Signal (DCS) in which, in line with its own capabilities, the capabilities required for the forthcoming transmission are selected. This is followed by a high speed training sequence related to synchronisation, equalisation and other functions.

When the receiving machine indicates its readiness to receive, Phase C is entered during which the transfer of facsimile information takes place. At this time the transmitting machine will progressively scan the input document, code and compress the pixel information according to the selected resolution and transmit the information at the selected speed. The receiving machine will correspondingly decompress and decode the received information and print the required image.

At the completion of each page, Phase D is entered. This post-message signalling determines if there are more pages to transmit, in which case Phase C is repeated. If there are no more pages then Phase E is entered at which time the call is terminated and the line disconnected.

It is necessary to refer to recent modifications to the standards for facsimile telecommunications as determined by the Study Group VIII of the CCITT. These allow for improvements in speed, resolution, network addressing procedures and also for file transfer to be accomplished as an alternative facsimile data type.

The procedures for non-facsimile image data transfer within the facsimile call are defined in modifications and appendices to the CCITT Recommendations T.4 and T.30 which govern facsimile telecommunications. In particular the file transfer modes permitted are:

(a) Basic Transfer Mode (BTM),
(b) Document Transfer Mode (DTM),
(c) Binary File Transfer (BFT), and
(d) Edifact transfer.

Of these, BFT is considered most general and most suitable for widespread application for PC compatible communications. This is because the binary file mode allows the transfer of any type of file including those indicated by the other modes. The first two transfer modes are more appropriate for integration with telex or similar communications, whereas the fourth relates specifically to the standard form for electronic data interchange for administration commerce and transport (EDIFACT).

Whereas for the following description of the preferred embodiments of the present invention, the binary file transfer mode will be most relevant, the preferred embodiments may include equipment which is capable of transceiving file information in any of the above modes and interfacing with equipment which is designed specifically for the transception of information in any of the above file transfer modes.

File transfers may be affected, with a compatible receiver, by making the appropriate DCS selection in Phase B. This may be after the completion of a normal facsimile transfer in Phase C. In this case, Error Correction Mode (ECM) will also be selected to guarantee data integrity. File transfer will take place in Phase C according to the BFT or other selected file transfer mode.

In the case of a facsimile device for a personal computer, the file or files selected for transfer, and those received will normally reside on the hard disk or floppy disk of the personal computer, according to the user's specification. In the case of non-computer based devices, the files for transception will normally reside on a floppy disk.

With all facsimile devices the facility may exist for the calling device to receive facsimile information from a remote called device which has a document to transmit (polling). This facility is also relevant for file transfers, as per CCITT Recommendation T.30.

STATEMENT OF THE INVENTION

According to the present invention there is provided a facsimile device for local facsimile/computer interconnection, comprising at the local site:

i) a first termination means for direct connection of a facsimile transceiver, ii) a second termination means for direct connection of a computer, iii) first communication means for communicating with the facsimile transceiver via said first termination means, iv) second communication means for communication with the computer via said second termination means, and v) control means for controlling the first communication means and the second communication means, wherein data signals are capable of being communicated from the facsimile transceiver to the computer or from the computer to the facsimile transceiver such that, at the local site, the facsimile transceiver can act as a printer for the computer and where the facsimile transceiver can act as a scanner for the computer.

According to the present invention there is further provided a method of printing using the above device comprising the steps of:

connecting a facsimile transceiver to the first termination means of the device, connecting a computer to the second termination means of the device, establishing communications between the computer and the facsimile transceiver via the device, sending data signals from the computer to the facsimile transceiver, and printing the data in the data signals on the facsimile transceiver.

According to the present invention there is further provided a method of scanning a document using the above device comprising the steps of:

connecting a facsimile transceiver to the first termination device of the device, connecting a computer to the second termination device of the device, establishing communications between the computer and the facsimile transceiver via the device, scanning a document on the facsimile transceiver, sending data signals representing the scanned document from the facsimile transceiver to the computer.

BRIEF DESCRIPTION OF THE DRAWINGS

Preferred embodiments of the present invention will hereinafter be described, by example only, with reference to the accompanying drawings in which:

FIG. 7 is a flow diagram illustrating reception of a facsimile transmission.

DETAILED DESCRIPTION OF THE PREFERRED EMBODIMENTS

Figure 1:
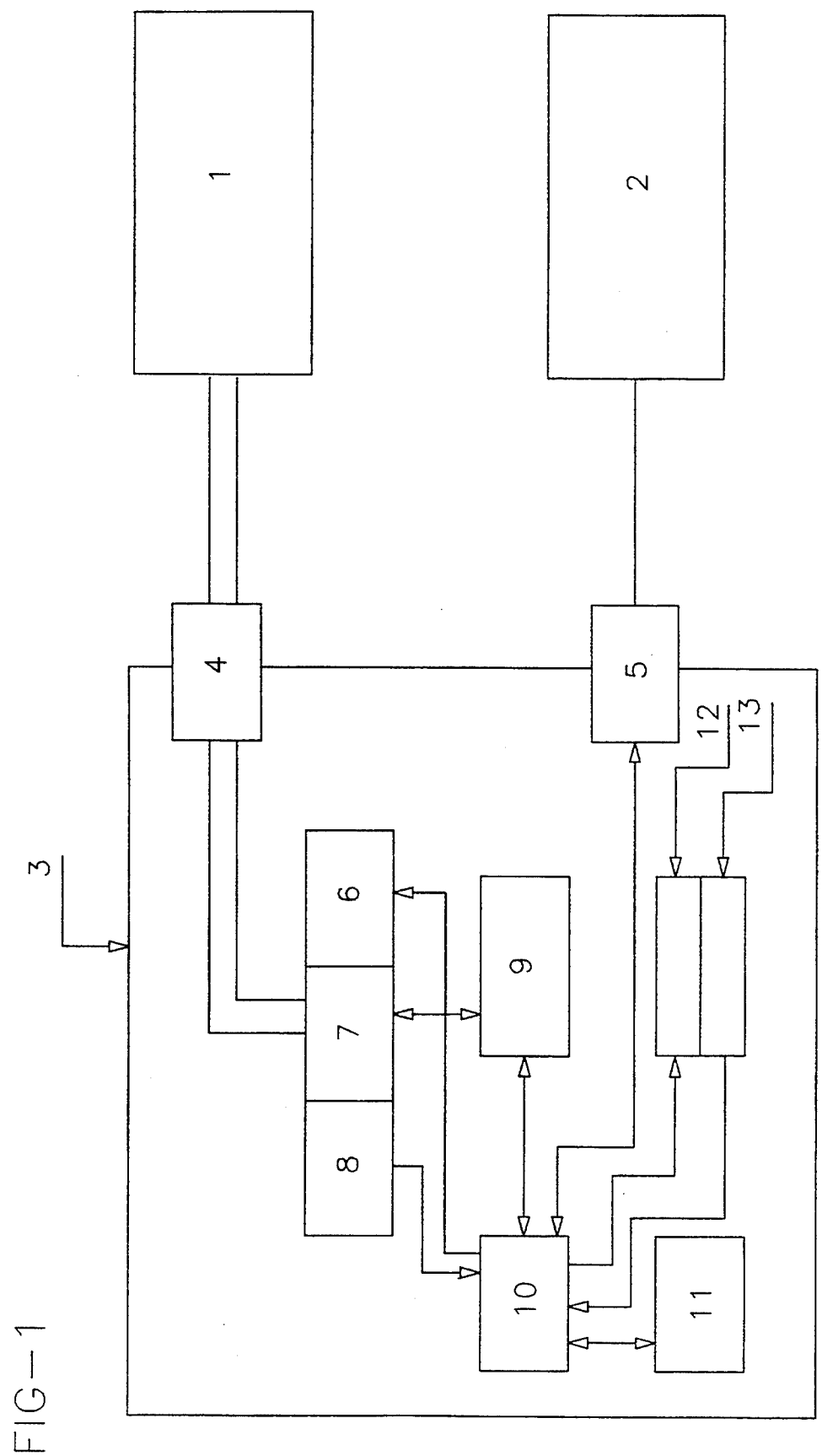
FIG. 1 illustrates a first preferred embodiment of the present invention.

FIG. 1 illustrates a local communications facsimile device 3 for local facsimile to computer interconnection. The device 3 is provided with a first termination means comprising connector 4 and a second termination means comprising a serial port connector 5. Connector 4 is preferably a PSTN-type connector for connection to the connector of the facsimile transceiver 1. A facsimile transceiver 1 can be directly connected to the connector 4 and a computer can be directly connected to the serial port connector 5 at a local site. The facsimile transceiver 1 and the computer 2 are thus connected to each other using the device 3.

The device 3 is further provides a first communications means having a ring generator means comprising ring generator 6, a first line interface means comprising line interface unit 7, and a first detector means comprising a line loop detector 8. The ring generator 6, line interface unit 7 and line loop detector 8 are connected to the connector for communication with the facsimile transceiver 1. There is further provided a control means comprising microprocessor 10 which is connected to the ring generator 6 and the line loop detector 8. A modem 9 is connected between the line interface unit and the microprocessor 10. The microprocessor 10 is also connected to a second communications means which includes the serial port connector 5 for communication with the computer 2. The microprocessor 10 may be provided with system memory 11 for storing communication information and a control program for the microprocessor 10. The device 3 may also be provided with a display 12 for communicating information to the user and a keypad 13 to provide the user with control of the device 3.

In use, the device 3 may be used to connect the computer 2 to a facsimile transceiver 1 to serve as a printer for the computer 2. When the computer 2 wishes to print to the facsimile transceiver 1, the computer 2 sends a printing request signal to the microprocessor 10 requesting the device 3 to establish communication with the facsimile transceiver 1 for the purposes of printing. Microprocessor 10 then sends a ring request signal to the ring generator 6 which produces a ring signal to the facsimile transceiver 1 via the connector 4. When the facsimile transceiver 1 answers the ring signal the line loop detector 8 detects the answer which is communicated to the microprocessor 10. The microprocessor 10 establishes communication between the device 3 and the facsimile transceiver 1 by exchanging communication protocol information according to Phase B as set out hereinbefore.

The microprocessor 10 then proceeds to receive the information to be printed from the computer 2 and forwards the serial data from the computer 2 to the modem 9. The modem 9 modulates the data and forwards the modulated data to the line interface unit 7. The line interface unit 7 then sends the modulated data to the facsimile transceiver 1 via the connector 4.

The facsimile transceiver 1 thus prints the data communicated from the computer 2 and once all the information has been transferred the microprocessor 10 indicates to the facsimile transceiver 1 that communications are completed and the microprocessor 10 terminates the data transfer from the computer 2 to the facsimile transceiver 1.

The facsimile transceiver 1 may also be used as a scanner for scanning documents and communicating the scanned documents to the computer 2. When using the facsimile transceiver 1 as a scanner, a number is dialled on the facsimile transceiver 1 as if the user requires to send a facsimile. The line loop detector 8 detects the dialling function of the facsimile transceiver 1 and the microprocessor 10 is readied for receiving a facsimile transmission from the facsimile transceiver 1. The microprocessor 10 answers the facsimile transceiver 1 using modem 9 and line interface 7. Communication is established between the microprocessor 10 and the facsimile transceiver 1 by exchanging the normal facsimile communication protocol information.

Once communication is established, the facsimile transceiver 1 sends modulated signals representing the scanned documents via the connector 4 to the line interface unit 7 and to the modem 9 where the modulated signals are demodulated. The demodulated signals are communicated from the modem 9 to the microprocessor 10. The microprocessor 10 can then transfer the demodulated signals representing the scan documents to the computer 2 via the serial port connector 5. Again, once facsimile transmission is completed the microprocessor 10 disconnects from the facsimile transceiver 1 and the computer 2.

The operation of the device 3 can be controlled via the display 12 and the key pad 13.

The microprocessor 10 is under control of a program stored in the system memory 11. The memory 11 may also be used as a buffer to temporarily store information transferred between the computer 2 and the facsimile transceiver 1 is either of the devices are disconnected.

Figure 2:
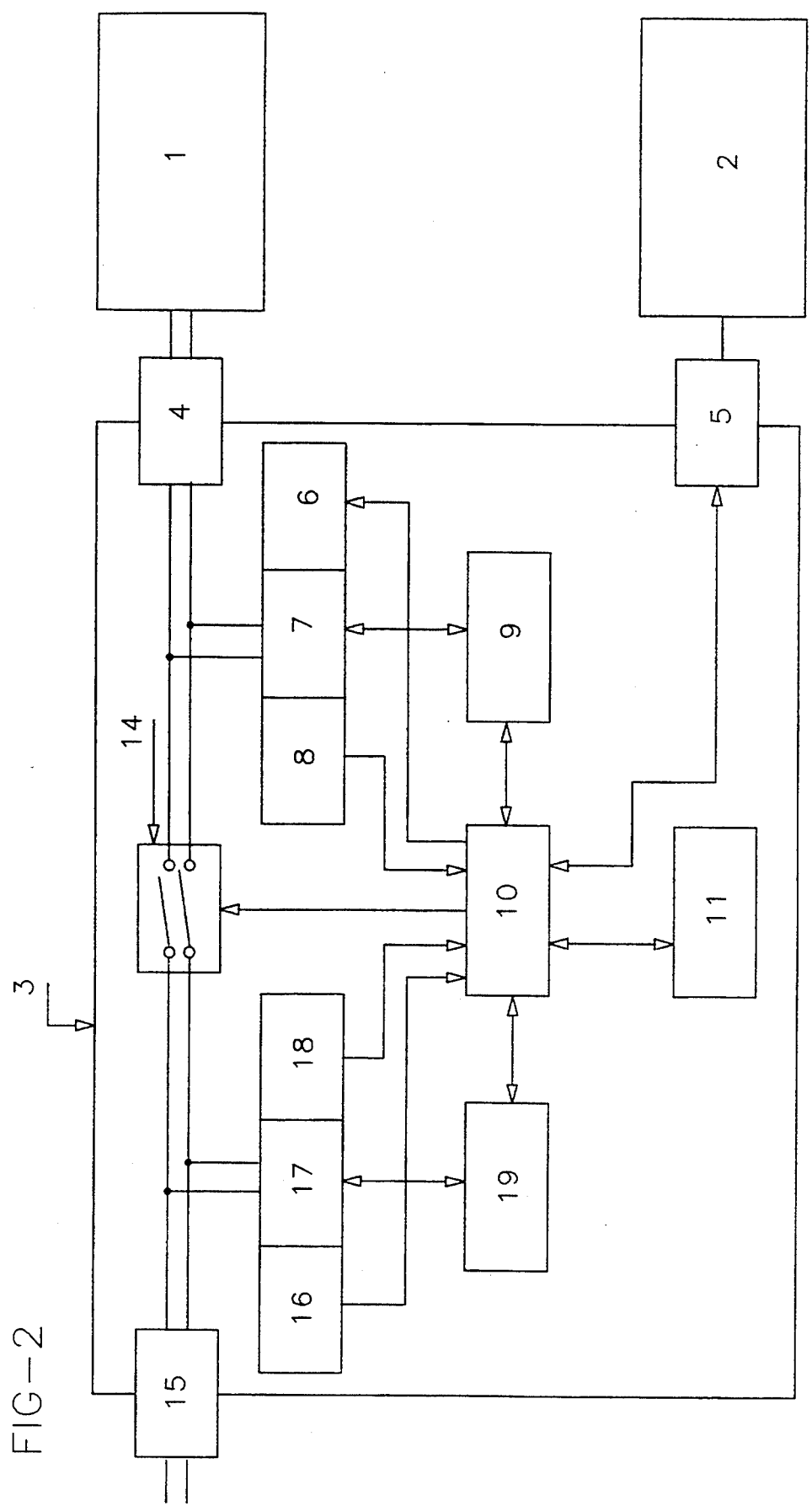
FIG. 2 illustrates a second preferred embodiment of the present invention.

FIG. 2 illustrates another preferred embodiment of the present invention which is provided with a third communication means for connecting the device 3 to a telephone network. The third communications device is comprised of a PSTN connector 15, a ring detector 16, a line interface unit 17, a line loop detector 18 and a modem 19. Using these features it is possible for the computer 2 to use device 3 as a standard modem for communicating with other devices at remote sites via the telephone network. The ring detector 16 detects a ring signal which comes in via the PSTN connector 15 if another device tries to contact the device 3. The ring detection signal is transmitted to the microprocessor 10 which then establishes communication with the other device via the line interface unit 17 and the modem 19. Upon completion of the communication, the line loop detector 18 detects where the other device disconnects or hangs up the telephone connection and communication with the device 3 is disconnected. The device shown in FIG. 2 can thus be used by the computer 2 as a normal data modem or facsimile modem for communicating with another device via PSTN connector 15. The device 3 may also be set such that any incoming calls are answered by the microprocessor 10 and directed to the computer 2.

A switch device 14 may be provided to connect the PSTN connector 15 to the connector 4 under the control of microprocessor 10. The device 3 can thus be set by the user such that switch 14 is closed and any incoming calls are automatically directed from the telephone network to the facsimile transceiver 1 via the switch 14. Similarly, the facsimile transceiver 1 can transmit a facsimile directly to the telephone network via switch 14. Alternatively, switch 14 may be open such that all incoming calls are firstly directed to microprocessor 10 which is then able to redirect the call either to the facsimile transceiver 1 or the computer 2. Similarly, either the facsimile transceiver 1 or the computer 2 may send facsimile information via the telephone network through the microprocessor 10. When transmitting a facsimile to or from the facsimile transceiver via the microprocessor 10, enhanced capabilities of the device 3 may be used for improved communication. For example, if the device 3 is able to transmit at higher speeds than that of the facsimile transceiver 1, the device 3 can be used to accelerate communication. Alternatively, the device 3 may be provided with Error Correction Mode and file transfer capabilities which thus augments the facilities provided by the facsimile transceiver 1 and the computer 2. The microprocessor 10 may also perform any buffering of data in memory 11 in order to maintain synchronisation between the local and remote devices.

If a file transfer is required, the transfer is effected by the microprocessor 10 in conjunction with an optional floppy disk drive which can be provided in the device 3. The files contained on the disk in the disk drive can then be transferred via the modem according to known file transfer procedures. On completion of the transmission and confirmation of a error free reception of the information, the call is terminated. Alternatively, the file transfer may be directed to the computer 2 for storage on the disk drive of the computer.

The device shown in FIG. 2 may also be used similarly to the device shown in FIG. 1 to allow the facsimile transceiver 1 to be used as a printer or a scanner. In such a mode of operation the connection 15 to the telephone network is disconnected.

Figure 3:
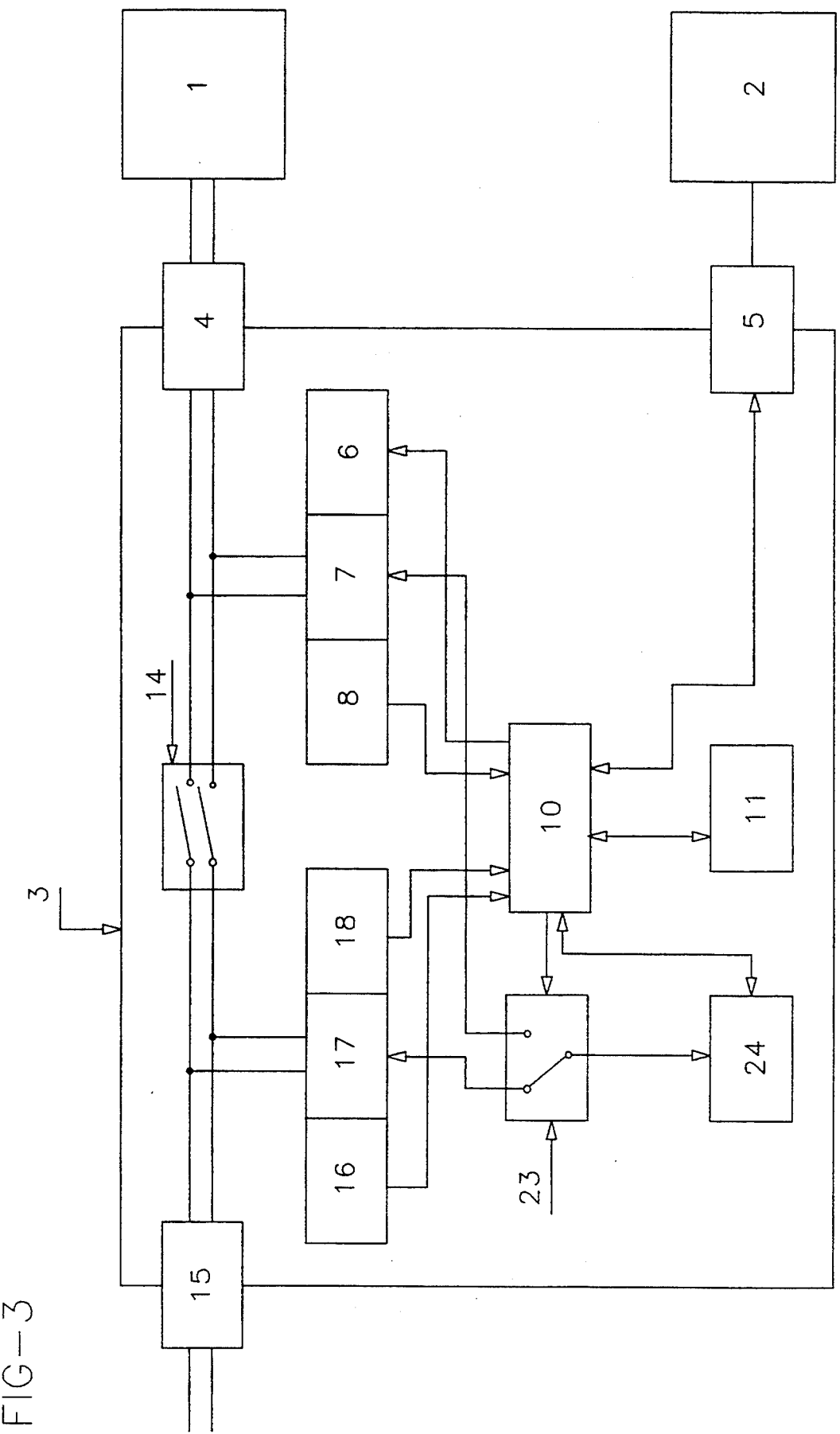
FIG. 3 illustrates a third preferred embodiment of the present invention.

FIG. 3 is another preferred embodiment of the present invention illustrating a device 3 similar to that of FIG. 2. Like features have been numbered using the same reference numerals. However, instead of having a modem 9 and a modem 19 as shown in FIG. 2, the device 3 shown in FIG. 3 has a modem 24 and a switch 23. The modem 24 is used to perform the same role as the modems 9 and 19 of FIG. 2 by switching the switch 23 to connect the modem either to the facsimile transceiver 1 or the telephone network. This embodiment reduces the cost of the device since only 1 modem component is required. In this case the local modem capabilities of the device enabling it to connect to both the external telephone line and the facsimile transceiver are achieved by switching the modem to the appropriate line. With this device, rerouting of facsimile data within one call session is not possible.

Figure 4:
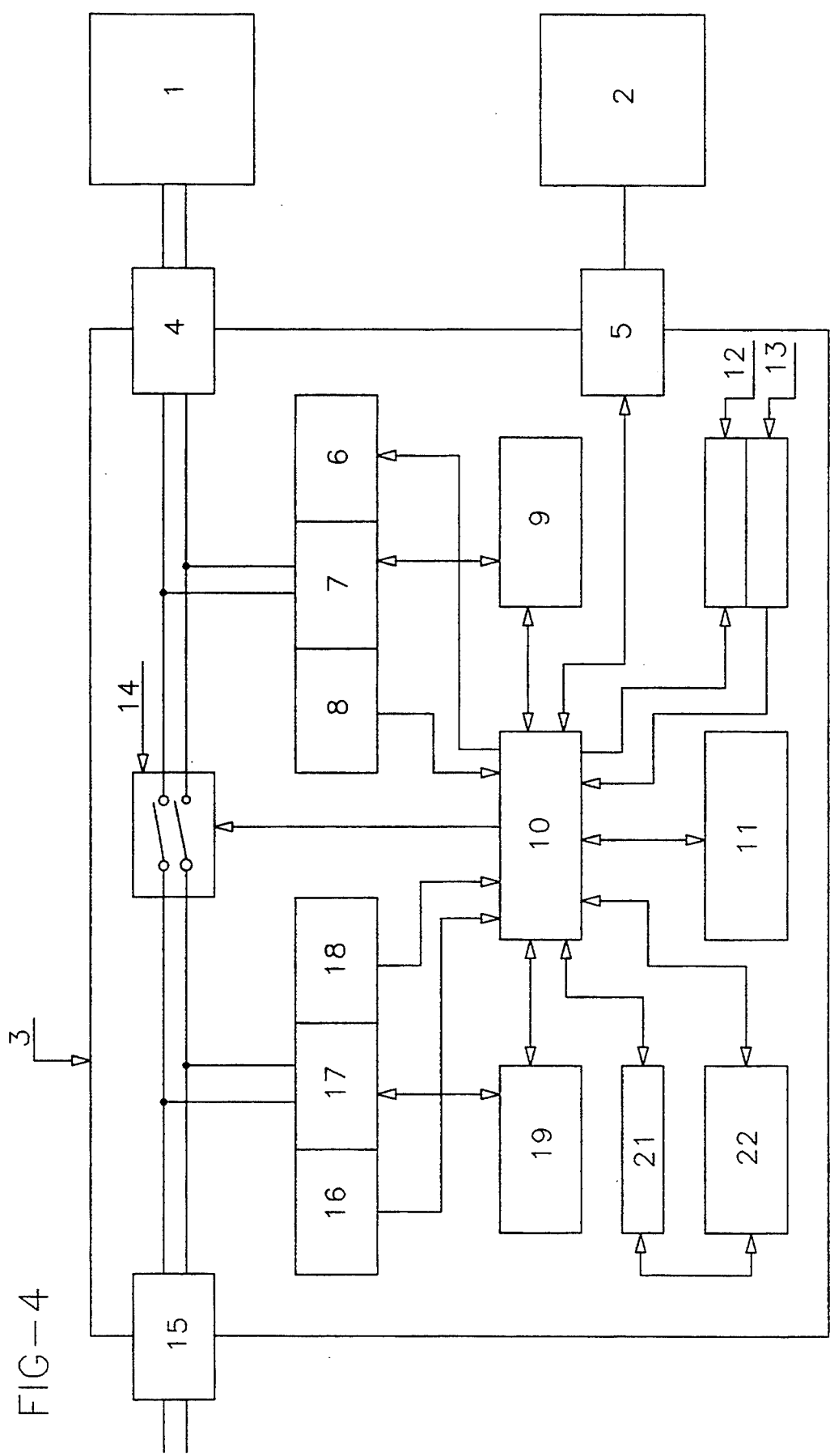
FIG. 4 illustrates a fourth preferred embodiment of the present invention.

FIG. 4 illustrates another preferred embodiment of the present invention similar to the preferred embodiment shown in FIG. 2. Like features have been numbered using similar reference numerals. However, the embodiment shown in FIG. 4 is further provided with a disk drive 21 and a disk controller 22 for controlling the disk drive 21. The disk drive 21 may be used for file transfer using the modified CCITT Recommendations T.4 and T.30 governing facsimile communication including file transfers using facsimile protocols. When requiring a file transfer using the device 3, a disk is inserted in the disk drive 21 and the key pad 13 is operated to indicate to the device 3 that the data stored on the disk can be transmitted from the device 3 to a remote location via the telephone network connected to PSTN connector 15. Similarly, when a transmission is received by the device 3 from the telephone network via PSTN connector 15, file transfer information may be directed to the disk drive 21 if the device 3 has been set to transfer such file information to the disk drive 21. Alternatively, file information may be sent to the personal computer 2, depending on the modes set on the facsimile device.

There are three operations in which the device 3 may be used. These include:

(a) sending a facsimile from the facsimile transceiver 1,
(b) sending a facsimile from the computer 2, and
(c) receiving a facsimile transmission from a remote location via the telephone network. The behaviour of the device, in terms of the routing of information is determined in each case by the current operating mode of the device.

These various Operating Modes of the device may be selected by the user via a special AT command set, or by hardware switch. The three Operating Modes of the preferred embodiment of the device are:
(1) PC-fax Mode.
(2) Normal facsimile Mode.
(3) Local Mode.

In the first Mode, the device operates as a facsimile modem in connection to the computer. Communications between the device and the computer are controlled via standard AT command set. Facsimile file conversions and session supervision may be provided by computer software. File transfer capabilities may be implemented by the computer software or provided in conjunction with the disk drive of the device. In this Mode the facsimile transceiver may also be used for sending facsimiles.

In the second operational Mode all incoming facsimiles are directed to the facsimile transceiver. This is the standby mode, when the computer is not in use, enabling the use of all existing functions of the facsimile transceiver. If available however, the computer may also be used to send facsimiles, including file transfers in this Mode.

The third operational Mode allows local communications. In this Mode a facsimile may be sent from the facsimile transceiver to the computer, enabling the facsimile, in conjunction with computer software, to operate as a desktop scanner. Similarly a facsimile may be sent from the computer to the facsimile transceiver, thus enabling the facsimile to be used as a printer.

In its simplest form this device relies on the facsimile transceiver or the computer for dialling functions. Alternatively, the device may incorporate its own dialling facility so that it may operate independently. When not in operation for remote communication it may transmit journal information regarding file transfers to the facsimile transceiver.

Figure 5:
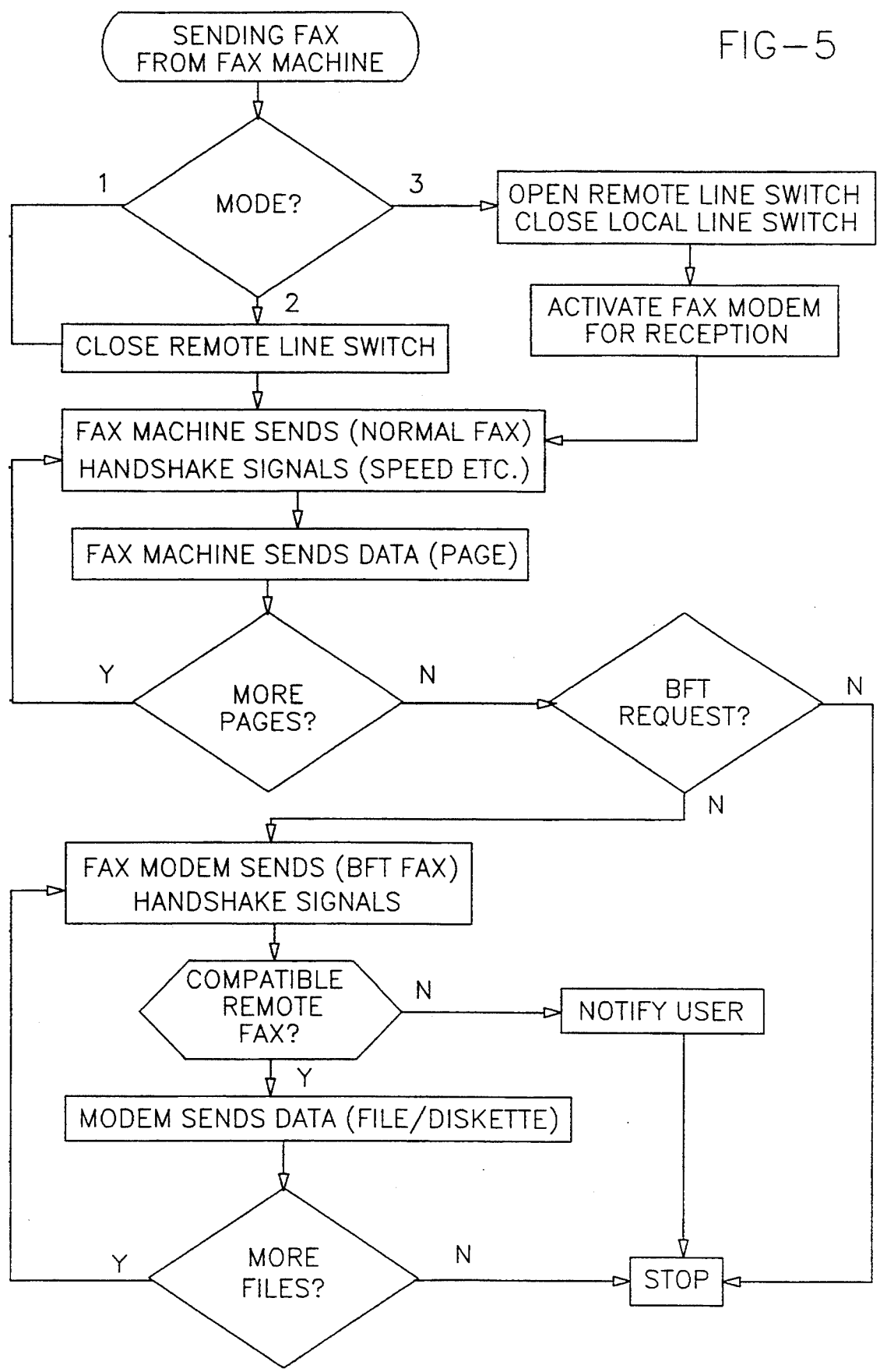
FIG. 5 is a flow diagram illustrating the process of sending a facsimile from the facsimile transceiver.

A flow chart, indicating the operation of the device 3, when a facsimile transmission is initiated from the facsimile transceiver 1 is shown in FIG. 5. In Modes 1 and 2, communication with a remote facsimile is initiated. In Mode 3, communication with the local facsimile transceiver 1 is initiated. In both cases, the call is detected by the ring detector 16 and line interface unit 17. At this time the switch 14 is closed by the microprocessor 10 for the purpose of call establishment.

In the implementation shown in FIG. 5, data is routed directly from the facsimile transceiver 1 to the PSTN connector 15 in the case of modes 1 and 2. When a file transfer is requested, this is performed at the end of a normal facsimile transmission. A file transfer in conjunction with the sending of a facsimile from the facsimile transceiver is facilitated in preferred embodiments of the invention which incorporate a disk drive.

Figure 6:
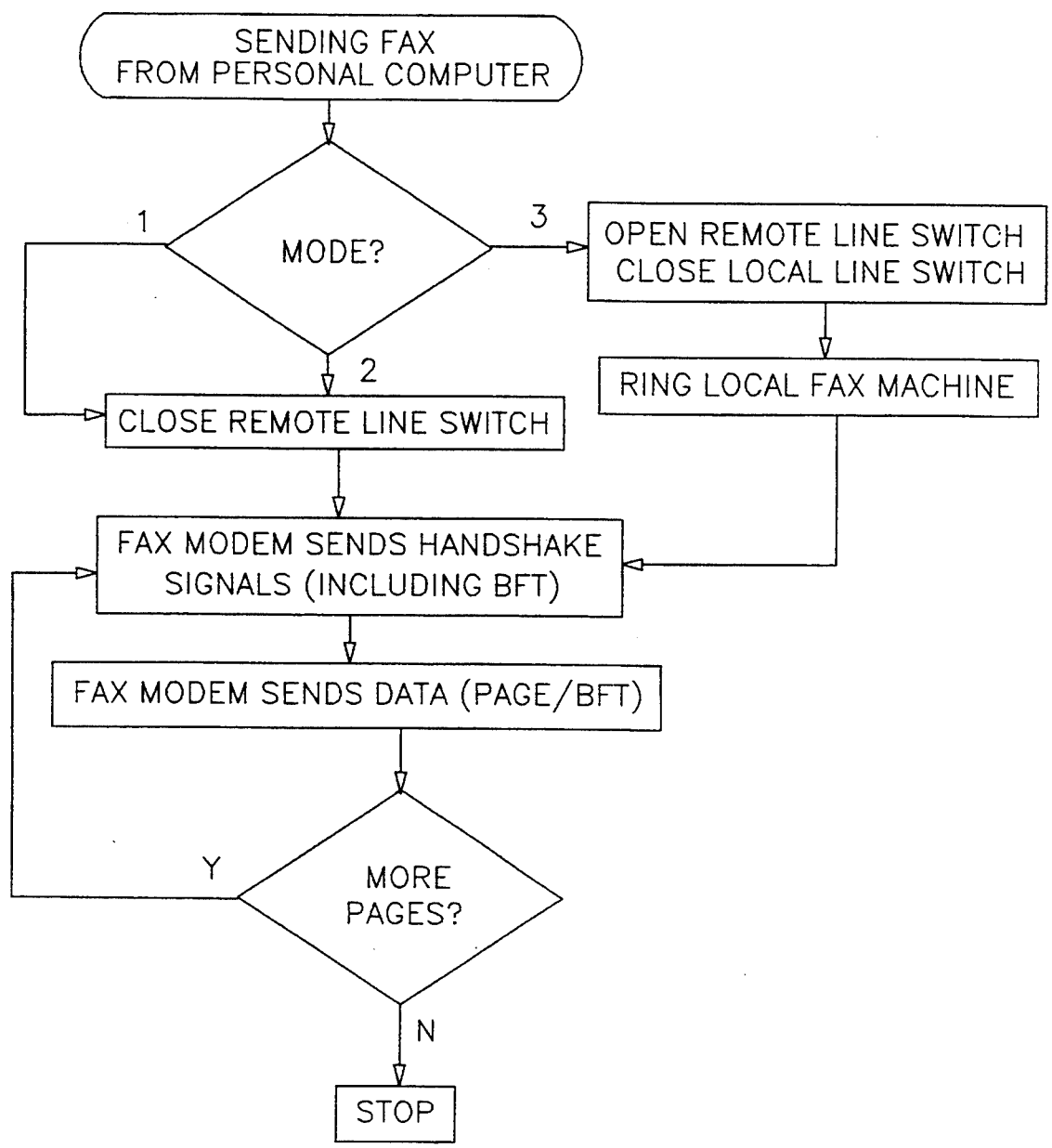
FIG. 6 is a flow diagram illustrating the process of sending a facsimile from the computer.

The operating procedure of the device 3 in sending a facsimile from the computer is shown in FIG. 6. In this case all sending operations are performed in conjunction with the computer 2. In Modes 1 and 2 the facsimile transceiver 1 is kept off line. In Mode 3 the outgoing facsimile is routed to the facsimile transceiver 1, thus providing an effective printing function for computer documents.

The operating procedure of the device 3 when receiving a facsimile is shown in FIG. 7. If the device 3 has been configured in Mode 1, the incoming data is routed to the computer. 2. In Mode 2, incoming data is routed to the facsimile transceiver 1.

Preferably, where the device contains its own disk drive, file information may be routed to disk and facsimile image data routed to the facsimile transceiver 1. Depending on the particular embodiment of the invention, the routing of data may be further selected by the user via appropriate commands or switches. Error diagnostics and file receive indication are provided by the user interface display.

Alternatively all received data may be optionally directed to the computer. In the case of embodiments not containing a disk drive, the device must be configured in Mode 1 in order to receive file transfers on the computer 2.

As indicated in FIG. 7, when the device 3 is configured for local mode operations, (Mode 3), it is unavailable to receive a facsimile from a remote source, and will not answer an incoming call.

The preferred embodiments may also provide the following facilities:
(a) While file transfers will utilise error correction mode (ECM) it may be necessary to convert data to standard mode for compatibility with existing facsimile transceivers. Alternatively, standard mode for standard facsimiles may be negotiated during the Phase B handshake.
(b) By utilising a store and forward mode, the device 3 may also provide additional facilities such as broadcasting and delayed transmission not possessed by the local facsimile transceiver.
(c) In the event of a breakdown in synchronisation between the local and remote facsimile transceivers, for example due to an out-of-paper condition, the device 3 may alternatively temporarily store facsimile information for later transfer to the facsimile transceiver 1.
(d) If a file transfer is selected for transmission, the device 3 will first check the disk to be facsimiled. The display 12 may indicate to the user the number of files the disk contains and the total number of bytes they comprise, or otherwise indicate a particular not-ready condition. An option may be provided whereby the user may sequentially display file names and mark individual files for transfer. An option may be provided so that subdirectories, where present, are either ignored or transferred.
(e) After a file transfer has been received the device 3 will indicate with a visible signal that a file transfer has taken place since the last operator attention. This will signal to the operator that the disk should be then removed and replaced with another blank formatted disk.
(f) In standby mode, the device may display the number of files and the number of free bytes remaining on the disk.
(g) As multiple transfers from different stations may be received to the same disk, the use of subdirectories to keep such information separate may be selected.
(h) Insufficient disk space on the receiving disk is a particular error condition which would be indicated to operators at each station. This would be handled in a similar way to the out-of-paper condition. Additionally RAM may be provided to store received information until a disk with sufficient free space is provided.
(i) The disk drives and controllers may be standard IBM compatible components. The disk size format (5.25" or 3.5") may thus be left up to the choice of the user.

High density disks would be preferred in receive mode.

Further capabilities common to the above devices may also be indicated. In particular it may be optionally selected that a received facsimile image may be both printed and stored into the memory device for later retrieval. File transfer and general data transfer capabilities, not in accordance with the CCITT facsimile standard may also be implemented in the same device.

The above preferred embodiments provide a facsimile device which can be used to connect a facsimile transceiver to a computer for communication between the facsimile transceiver and the computer. The facsimile transceiver can thus be used as a printer or a scanner for the computer. Optionally, the device may be connected to a telephone network, thus enabling communication between the computer or the facsimile transceiver to devices at remote locations. In such a configuration the facsimile devise can operate either as a standard modem or a facsimile modem. In another preferred embodiment file transfers may also be made using facsimile protocols using a floppy disk drive built into the device.

It will be obvious to those skilled in the art that numerous alterations and modifications can be made to the devices encompassing the invention other than those specifically described above without departing from the basic concepts of the invention. For example, the facsimile device may be provided on a card for location in the computer. The card would have a connector for the facsimile transceiver to connect the computer directly to the facsimile transceiver.

All such modifications and alterations are to be considered within the scope of the invention, the nature of which is to be determined from the foregoing description.

I claim:

1. A modem device for communication of facsimile or file data, said device being responsive to "AT" commands received from a computer and comprising:
   control means for controlling the communication of said data, said control means including a microprocessor,
   first termination means for local connection to a facsimile transceiver,
   second termination means for local connection to the computer,
   third termination means for connection to a remote telephone exchange, and
   communications means having modem means for modulating and demodulating signals between the second termination means and the first or third termination means; wherein the device has operating modes selectable by the microprocessor in response to particular said "AT" commands received from the computer via the second termination means, the operating modes comprising
   i) a first operating mode enabling communication of said data to occur to and from the computer via the remote telephone exchange;
   ii) a second operating mode enabling communication of said data to occur to and from the facsimile transceiver via the remote telephone exchange;
   iii) a third operating mode enabling communication of said data to occur between the computer and the facsimile transceiver enabling the facsimile transceiver to act as a printer or scanner for the computer
   and wherein said control means further comprises:
   (i) a facsimile connection switch switchable by the microprocessor which when in a direct communication state allows direct communication of data between the first termination means and the third termination means and when in a non-direct connection state prevents said direct communication,
   (ii) a modem routing switch switchable by the microprocessor and which enables said modem means to be connected in a first switch state for permitting communication between the facsimile transceiver and the microprocessor through the first termination means and in a second switch state for permitting communication between the remote telephone exchange and the microprocessor through the third termination means, and wherein
      a) when the device is in the first operating mode the facsimile connection switch is in the non-direct state and the modem routing switch is in the second switch state;
      b) when the device is in the third operating mode the facsimile connection switch is in the non-direct state and the modem routing switch is set to the first switch state;
      c) when the device is in either the first or the third operating mode, the data is communicated via the microprocessor.

2. A device according to claim 1, wherein the said modem means is connected to the microprocessor for permitting communication between the facsimile transceiver and the microprocessor through the first termination means, and wherein said communications means further includes second modem means connected to the microprocessor for permitting communication between the remote telephone exchange and the microprocessor through the third termination means.

3. A device according to claim 1, wherein the facsimile connection switch is in the direct state when the device is in the second operating mode and wherein the modem means setting the routing switch to the second switch state also enables transmission of data from the computer via the third termination means.

4. A device according to claim 1, wherein, when the device is in the second operating mode, setting the facsimile connection switch in the non-direct state and the modem routing switch in the second switch state enables the data to be communicated via the microprocessor.

5. A device according to any one of claims 1, 2, 3 or 4, wherein one or more of the operating modes is also selectable manually by a user.

6. A device according to any one of claims 1, 2, 3 or 4, wherein the communication means further comprises a ring generator for generating a ring signal to the facsimile transceiver.

7. A device according to claim 1 or 2, further comprising memory means associated with the microprocessor to store the data for delayed or buffered transmission.

8. A device according to claim 7, wherein the microprocessor and the memory means are adapted to store data for delayed transmission from the facsimile transceiver to the remote telephone exchange.

9. A device according to claim 8, wherein the data can be transmitted through the device faster than a maximum transmission rate of the facsimile transceiver and the delayed transmission is used as an accelerator.

10. A device according to claim 7, wherein the microprocessor is used to enhance the transmission by incorporation of an advanced feature not possessed by the facsimile transceiver.

11. A device according to claim 10, wherein the advanced feature is selected from the group consisting of error correction and broadcasting.

12. A device according to any one of claims 1, 2, 3 or 4 wherein during one continuous session, the control means monitors an incoming facsimile signal to determine the type of the data received through the third termination means and diverts data of file type to a disk storage means, and data of facsimile type to the facsimile transceiver.

13. A device according to claim 12 which thereafter continues to monitor the data for signals indicating changes in the data type, diverting the data as necessary.

14. A device according to claim 12 wherein the disk storage means is contained within the device.

15. A device according to any one of claims 1, 2, 3 or 4 with the additional capability of transmitting a combination of file type and facsimile type data via the third termination means, by augmenting transmission of said data with control signals such that facsimile type data from the facsimile transceiver or the computer may be combined with file type data from a disk storage means such that both the file type data and the facsimile type data may be sent via the third termination means as part of one continuous transmission.

* * * * *

UNITED STATES PATENT AND TRADEMARK OFFICE
CERTIFICATE OF CORRECTION

PATENT NO. : 5,452,106
DATED      : Sep. 19, 1995
INVENTOR(S): John L. Perkins

It is certified that error appears in the above-indentified patent and that said Letters Patent is hereby corrected as shown below:

Title page, [73] Assignee should be:
--EXFAX TECHNOLOGIES PTY LTD--

Signed and Sealed this

Seventh Day of May, 1996

Attest:

BRUCE LEHMAN

Attesting Officer    Commissioner of Patents and Trademarks